US009497445B2

(12) United States Patent
Moller et al.

(10) Patent No.: US 9,497,445 B2
(45) Date of Patent: Nov. 15, 2016

(54) HIGH SPEED DISPLAY SHUTTER FOR AUTOSTEREOSCOPIC DISPLAY (75) Inventors: Christian Moller, Oslo (NO); Doug Patterson, Sevenoaks (GB); Thomas Ericson, Bromma (SE); Ingolf Dahl, Mölndal (SE)

(73) Assignee: SETRED AS, Oslow (NO)

( * ) Notice: Subject to any disclaimer, the term of this patent is extended or adjusted under 35 U.S.C. 154(b) by 1342 days.

(21) Appl. No.: 12/297,590

(22) PCT Filed: Apr. 19, 2007

(86) PCT No.: PCT/GB2007/001407
§ 371 (c)(1),
(2), (4) Date: Feb. 4, 2009

(87) PCT Pub. No.: WO2007/119064
PCT Pub. Date: Oct. 25, 2007

(65) Prior Publication Data
US 2010/0026795 A1  Feb. 4, 2010

(30) Foreign Application Priority Data

Apr. 19, 2006 (GB) .................................. 0607726.7
Apr. 19, 2006 (GB) .................................. 0607727.5

(51) Int. Cl.
*H04N 13/04* (2006.01)
*H04N 9/47* (2006.01)
*G09G 3/34* (2006.01)

(52) U.S. Cl.
CPC ...... *H04N 13/0413* (2013.01); *H04N 13/0402* (2013.01); *H04N 13/0404* (2013.01); *H04N 13/0497* (2013.01)

(58) Field of Classification Search
CPC ..................... H04N 13/0402; H04N 13/0418; H04N 13/0404; H04N 13/0497
USPC .............................. 348/56, 51; 345/108, 109
See application file for complete search history.

(56) References Cited

U.S. PATENT DOCUMENTS 4,740,073 A   4/1988  Meacham
4,853,769 A   8/1989  Kollin
(Continued)

FOREIGN PATENT DOCUMENTS

CN    1269103 A    10/2000
CN    1573421 A    2/2005
(Continued)

OTHER PUBLICATIONS

Stereographics® Developers' Handbook; Background on Creating Images for CrystalEyes® and SimulEyes®; © 1997 SteroGraphics Corporationl 66 pages.
(Continued)

Primary Examiner — Tonia L Dollinger
Assistant Examiner — Adam Cooney
(74) Attorney, Agent, or Firm — DLA Piper LLP (US); Gianni Minutoli (57) ABSTRACT A shutter for an autostereoscopic display, said shutter comprising a first switchable aperture array having a relatively fast switching time from a substantially transparent state to a substantially opaque state, and a second switchable aperture array having a relatively fast switching time from a substantially opaque state to a substantially transparent state, wherein said first switchable aperture array and said second switchable aperture at least partially overlap.

31 Claims, 8 Drawing Sheets

(56) References Cited

U.S. PATENT DOCUMENTS

| | | | |
|---|---|---|---|
| 5,132,839 | A | 7/1992 | Travis |
| 5,465,175 | A | 11/1995 | Woodgate et al. |
| 5,678,089 | A | 10/1997 | Bacs et al. |
| 5,699,112 | A | 12/1997 | Bacs, Jr. |
| 5,825,541 | A * | 10/1998 | Imai .................. 359/464 |
| 5,875,055 | A | 2/1999 | Morishima et al. |
| 5,880,704 | A * | 3/1999 | Takezaki .................. 345/6 |
| 5,986,640 | A | 11/1999 | Baldwin et al. |
| 5,991,551 | A | 11/1999 | Bacs et al. |
| 6,014,164 | A | 1/2000 | Woodgate et al. |
| 6,128,132 | A | 10/2000 | Wieland et al. |
| 6,172,807 | B1 | 1/2001 | Akamatsu |
| 6,324,347 | B1 | 11/2001 | Bacs, Jr. et al. |
| 6,377,295 | B1 | 4/2002 | Woodgate et al. |
| 6,603,504 | B1 | 8/2003 | Son et al. |
| 6,674,463 | B1 * | 1/2004 | Just et al. .................. 348/43 |
| 6,712,471 | B1 | 3/2004 | Travis et al. |
| 6,795,241 | B1 | 9/2004 | Holzbach |
| 6,927,886 | B2 | 8/2005 | Plesniak et al. |
| 6,970,290 | B1 * | 11/2005 | Mashitani et al. ............ 359/462 |
| 7,023,466 | B2 | 4/2006 | Favalora et al. |
| 7,043,073 | B1 | 5/2006 | Holzbach |
| 7,046,271 | B2 | 5/2006 | Doerfel et al. |
| 7,573,491 | B2 | 8/2009 | Hartkop et al. |
| 7,633,528 | B2 | 12/2009 | Fukushima et al. |
| 7,652,665 | B2 | 1/2010 | Fukushima et al. |
| 8,179,424 | B2 | 5/2012 | Moller |
| 2001/0045951 | A1 | 11/2001 | Allen |
| 2003/0128871 | A1 | 7/2003 | Naske et al. |
| 2004/0046941 | A1 * | 3/2004 | Yamamoto .................. 353/31 |
| 2004/0057111 | A1 | 3/2004 | Dominguez |
| 2004/0070556 | A1 | 4/2004 | Weitbruch et al. |
| 2005/0099688 | A1 | 5/2005 | Uehara et al. |
| 2006/0012878 | A1 | 1/2006 | Lipton et al. |
| 2006/0233446 | A1 | 10/2006 | Saito et al. |
| 2006/0262376 | A1 | 11/2006 | Mather et al. |
| 2008/0018732 | A1 | 1/2008 | Moller |
| 2009/0309887 | A1 | 12/2009 | Moller et al. |
| 2011/0109629 | A1 | 5/2011 | Ericson et al. |

FOREIGN PATENT DOCUMENTS

| | | |
|---|---|---|
| EP | 0 541 374 | 5/1993 |
| EP | 0 625 861 | 11/1994 |
| EP | 0 804 042 A2 | 10/1997 |
| EP | 0 847 208 A2 | 6/1998 |
| EP | 0 860 728 A1 | 8/1998 |
| EP | 1 089 573 A2 | 4/2001 |
| EP | 1 401 216 A2 | 3/2004 |
| GB | 2 206 763 | 1/1989 |
| GB | 2 405 043 A | 2/2005 |
| GB | 2 405 517 A | 3/2005 |
| GB | 2 406 730 A | 4/2005 |
| GB | 2 406 731 | 4/2006 |
| GB | 2 428 344 A | 1/2007 |
| JP | 58199321 | 11/1983 |
| JP | 62153833 | 7/1987 |
| JP | 03119889 | 5/1991 |
| JP | 09171156 | 6/1997 |
| JP | 10 322726 | 12/1998 |
| KR | 20050016344 | 2/2005 |
| WO | WO 98/43441 | 10/1998 |
| WO | WO 03/054797 A2 | 7/2003 |
| WO | WO03/090479 | 10/2003 |
| WO | WO 2005/106572 A1 | 11/2005 |
| WO | WO2005/112474 | 11/2005 |

OTHER PUBLICATIONS

International Search Report for International Application No. PCT/GB2007/001406 dated Jul. 24, 2007.

International Search Report for International Application No. PCT/IB2005/001480 dated Dec. 21, 2005.

Application and File History for U.S. Appl. No. 11/569,048, filed May 8, 2007, inventor Moller.

Application and File History for U.S. Appl. No. 12/675,937, filed Jan. 24, 2011, inventors Ericson et al.

Office Action dated Apr. 2, 2013 for Chinese Application No. 201110081768.2, 6 pages.

International Search Report for International Application No. PCT/GB2008/002933 dated Jan. 19, 2009.

File History for U.S. Appl. No. 12/297,581.

* cited by examiner

Figure 1

Autostereoscopic display

Figure 2

Single cell shutter

Figure 3
Double cell configuration

Figure 4
Double cell configuration

Figure 5

Polarizer turned 90°
PA cell buffed upper surface 45°, lower surface 225°
Polarizer turned 0°
PA cell buffed upper surface 135°, lower surface 315°
Retarder sheet with slow axis at 45 degrees
Polarizer turned 90°

AC drive scheme

Figure 10

Single sided and four sided backplane connector

Figure 11

Variable drive signal

Double shutters with same slit width

Ghosting from straight on

Figure 15

Ghosting only from angles

HIGH SPEED DISPLAY SHUTTER FOR AUTOSTEREOSCOPIC DISPLAY

RELATED APPLICATIONS

This application is a national stage entry from PCT Application No. PCT/GB2007/001407 filed Apr. 19, 2007, which claims priority to Great Britain Application No. 0607726.7 filed Apr. 19, 2006, and Great Britain Application No. 0607727.5, filed Apr. 19, 2006, the disclosures of which are hereby incorporated by reference in their entireties.

FIELD OF THE INVENTION

This invention relates to a shutter. In embodiments the shutter is suitable for an autostereoscopic display. In operation, embodiments of the shutter function to switch between an optically transparent state and an optically opaque state.

BACKGROUND

An autostereoscopic system particularly suitable for the shutter described in this document is the time-multiplexed system described in PCT application PCT/IB2005/001480. However, the shutter is suitable for any application where high switching speeds and high contrast are required.

An autostereoscopic or 3D display can be implemented by synchronising a high frame rate screen for displaying a two dimensional image with a fast switching shutter. If each frame on the screen is synchronised with a corresponding slit, and the images and slits are run at sufficient speeds to avoid flicker, typically 50 Hz or above, then a 3D image can be created.

Figure 1:
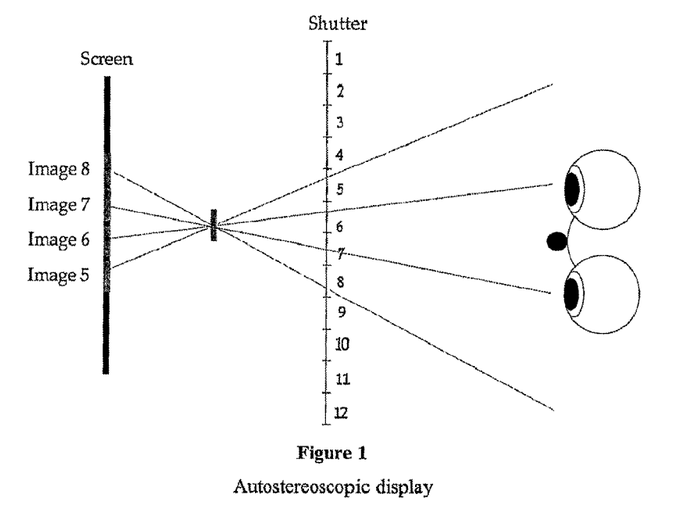
FIG. 1 illustrates a viewer looking a screen through a shutter.

FIG. 1 shows the principle of an autostereoscopic display. As shown in the diagram, when the screen is viewed through one open slit of the shutter, each eye sees a different part of the screen, and hence each eye sees a different part of an image displayed on the screen. Image 1 is displayed on the screen whilst slit 1 is open. Similarly slit 2 is open when frame 2 is displayed. By repeating the process sufficiently fast such that each slit is perceived as flicker-free the entire shutter will represent a window into a 3D scene. It is assumed that the individual images displayed represent the correct perspectives through each slit. By way of example, given a flicker rate of 60 Hz, a 12 slit shutter requires a display capable of a refresh rate of 720 Hz.

SUMMARY

According to an aspect of the present invention, there is provided a shutter for an autostereoscopic display, said shutter comprising:
a first switchable aperture array having a relatively fast switching time from a substantially transparent state to a substantially opaque state, and
a second switchable aperture array having a relatively fast switching time from a substantially opaque state to a substantially transparent state,
wherein said first switchable aperture array and said second switchable aperture at least partially overlap.

The first and second switchable aperture arrays may be aligned. The first and second switchable aperture arrays may be superposed. The first and second switchable aperture arrays may be arranged such that a line through the centre of both an aperture of the first switchable aperture array and an aperture of the second switchable aperture array is normal to the surface of both apertures. The first and second switchable aperture arrays may be arranged so as to relatively offset.

The first switchable aperture array may be positioned between the second switchable aperture and a two dimensional display. Alternatively, the second switchable aperture array may be positioned between the first switchable aperture and a two dimensional display. The two dimensional display may be a screen of a projector. The projector may use a DMD.

According to an aspect of the present invention, there is provided a method of operating the shutter comprising:
arranging the first switchable aperture array to be in a substantially transparent state;
arranging the second switchable aperture array to be in a substantially opaque state;
switching the second switchable aperture array from a substantially opaque state to a substantially transparent state, rendering a portion of the shutter substantially transparent, and
switching the first aperture array from a substantially transparent state to a substantially opaque state, rendering a portion of the shutter substantially opaque.

According to an aspect of the present invention, there is provided a method of operating the shutter comprising:
rendering a portion of the shutter substantially transparent by
switching to transparent a first set of adjacent apertures of the first switchable aperture array
switching to transparent a second set of adjacent apertures of the second switchable aperture array
wherein the first set of adjacent apertures face the second set of adjacent apertures, and the second set of apertures comprises a greater number of apertures than the first set of apertures.

The first set and the second set of apertures may share a common central axis. The first set and the second set of apertures may be offset laterally in a direction perpendicular to the length of the apertures and perpendicular to the plane containing the apertures.

The first switchable aperture array has a first fall time for switching time from a substantially opaque state to a substantially transparent state. The second switchable aperture array has a second fall for switching from a substantially transparent state to a substantially opaque state. The first and second fall times may be identical. The first and second fall times may be different. The first and second fall times may be different and one switchable aperture array may have a better contrast ratio than the other switchable aperture array. In such a case, the switching scheme is modified to improve contrast ratio of the shutter. This may be done by making the switchable aperture array with the greater contrast ratio to be substantially opaque where either switchable aperture array may be used to make a portion of the shutter substantially opaque.

The method may reduce the occurrence of striping. Striping occurs when, for a given sub frame, the field of view through two adjacent transparent portions of the shutter is sufficiently narrow that there is a portion of the screen that cannot be seen. In the space on either side of the visible portions of the screen, the viewer sees the closed shutter. If the viewer goes sufficiently far to the side he will only see the closed shutter and the display will appear black. If the viewer sees partially visible portions of the screen and partially the closed shutter the overall appearance when all subframes have been scanned will be black stripes on the image. The viewer may also look into partially closed shutter in which case the stripes will be grey. This artefact of the display is called striping.

In a dual switchable aperture apparatus, for a given screen bandwidth striping can be minimized by optimizing the aperture opening sequence such that a greater number of switchable apertures are open in one switchable aperture array than the other switchable aperture array.

The order in which the apertures are opened may be determined by minimizing a cost function associated with straight on ghosting and ghosting at an angle. Straight on ghosting may be caused by adjacent shutters being opened consecutively, such that an aperture which defines an edge of a first open shutter must change state by making a slow transition between substantially transparent and substantially opaque, prior to the opening of a second shutter. Ghosting at an angle may be caused by proximal shutters being opened consecutively, such that an aperture close to the edge of a first open shutter must change state by making a slow transition between substantially transparent and substantially opaque, prior to the opening of a second shutter. Proximal shutters may be separated by one or more apertures.

The cost function may further take into account striping. The cost function may account for striping by assigning a cost to a ratio of the number of apertures open in the first switchable aperture array to the number of apertures open in the second switchable aperture array. The closer the ratio is to 1, the greater the striping effect.

In an embodiment, the ratio is 3, such that for an open slit in the shutter one aperture is open in the first switchable aperture array, and three apertures are open in the second switchable aperture array. In this embodiment the one open aperture of the first switchable aperture array is arranged aligned with the central aperture of the three open apertures of the second switchable aperture array.

The ratio may be varied in order to alter the properties of the autostereoscopic display. The closer the ratio is to one the greater the striping effect. The further the ratio is from one, the greater the likelihood of ghosting effects. The sequence of opening apertures may be varied to alter the striping and ghosting effects. The sequence of opening apertures may be optimised to reduce the striping and ghosting effects.

The number of open apertures for an open shutter can be varied to alter the optical properties of the autostereoscopic display. Wider slits reduce depth field but increase brightness and resolution. Narrower slits increase depth filed but decrease brightness and resolution.

The optical properties of the autostereoscopic display may be varied in order to use a display for different purposes. Examples of such purposes are: viewing by a single person, viewing by a group of people over a wide viewing angle, providing a detailed static image, and providing fast moving images.

The first switchable aperture array may have a relatively slow switching time from a substantially opaque state to a substantially transparent state.

The second switchable aperture array may have a relatively slow switching time from a substantially transparent state to a substantially opaque state.

The first and second switchable aperture arrays may comprise LCD aperture arrays.

Each aperture array may comprise a plurality of parallel switchable apertures.

Each aperture of each aperture array is switchable between a substantially transparent state and a substantially opaque state.

The apertures of the first switchable aperture array may be parallel to the apertures of the second switchable aperture array. The apertures of the first switchable aperture array may be aligned so as to overlay the apertures of the second switchable aperture array.

The first and second switchable aperture array may be arranged such that a surface of the first switchable aperture array faces a surface of the second switchable aperture array, and wherein the shutter further comprises: a first polarizer arranged on a surface of the first switchable aperture array opposite the surface of the first switchable aperture array facing the second switchable aperture array; and a second polarizer arranged on a surface of the second switchable aperture array opposite the surface of the second switchable aperture array facing the first switchable aperture array.

A third polarizer may be arranged between the first and second switchable aperture arrays.

The first and second switchable aperture arrays may comprise Liquid Crystal Display (LCD) units. Each LCD unit may comprise a planar aligned liquid crystal material. Each LCD unit may have a director.

The shutter may comprise:
a top polariser at 135°,
a first LCD unit with director at 90°,
a middle polariser at 45°,
a second LCD unit with director at 0°, and
a bottom polariser at 45°.

The middle polariser improves the performance of the shutter by ensuring light entering the second LCD unit is of the correct polarisation. The middle polariser acts as a clean up filter.

The second switchable aperture array is normally black (i.e. opaque). The second switchable aperture array may contain a liquid crystal and a dye. The dye improves the opacity of the second switchable aperture in the substantially opaque state. The dye does this by absorbing light.

The shutter may comprise a compensation cell. The compensation cell comprises a liquid crystal layer the same thickness as the liquid crystal layer of the second switchable aperture array.

The shutter may comprise a compensation filter. The compensation filter comprises a retardation film with optical properties matching the optical properties of the second switchable aperture array.

The first and/or second switchable aperture arrays may comprise one of: a planar aligned liquid crystal, a vertically aligned liquid crystal, and a twisted nematic liquid crystal.

The first and/or second switchable aperture arrays may employ dual frequency liquid crystals. The first and/or second switchable aperture arrays may employ electrically commanded surfaces.

The first switchable aperture array may comprise a planar aligned liquid crystal and the second switchable aperture array may comprise a vertically aligned liquid crystal or a twisted nematic liquid crystal.

A shutter is open when one or more apertures in the first switchable aperture array are transparent, and adjacent to this, one or more apertures in the second switchable aperture array are transparent. The viewing angle can be modified by varying the number of apertures which are transparent in the first and second switchable aperture array to create an open shutter. Fewer transparent apertures for an open shutter create a narrower viewing angle. More transparent apertures for an open shutter create a wider viewing angle.

The first and second switchable aperture arrays form a shutter array. The shutter array cooperates with a display screen to create a display apparatus. An arrangement may be provided to alter the separation between the display screen and the shutter array to change the characteristics of the display apparatus for different purposes. The arrangement may be a simple electromechanical arrangement comprising motors, worm gears and racks at each corner of the display apparatus.

According to an embodiment, there is provided a shutter for an autostereoscopic display, said shutter comprising: a first switchable aperture array; and a second switchable aperture array.

According to an embodiment, the first switchable aperture array has a relatively fast switching time from a substantially transparent state to a substantially opaque state, and a relatively slow switching time from a substantially opaque state to a substantially transparent state. Further, the second switchable aperture array has a relatively slow switching time from a substantially transparent state to a substantially opaque state, and a relatively fast switching time from a substantially opaque state to a substantially transparent state.

Accordingly, embodiments provide a shutter that is a composite of two aperture arrays, one laid over the other. The aperture arrays are arranged and switched such that the shutter transitions from a first state to a second state upon the fast transition of one of the aperture arrays; and the shutter transitions from a second state to a first state upon the fast transition of the other of the aperture arrays. In this way, a shutter is provided that has a fast switching time in both ways between a first and second state. In a first state a portion of the shutter may be substantially transparent. In a second state a portion of the shutter may be substantially opaque.

According to an embodiment, there is provided a shutter for an autostereoscopic display, the shutter comprising: a first switchable aperture array; and a second switchable aperture array, wherein the first switchable aperture array and the second switchable aperture at least partially overlap. The first switchable aperture array and the second switchable aperture may at least partially overlap as observed by a user viewing the autostereoscopic display.

A shutter according to embodiments provides an autostereoscopic display apparatus that allows for the reproduction of a clear 3D image that is high contrast, flicker free and without ghosting.

In the embodiments described below, Liquid Crystal Display (LCD) technology is used in a shutter. However, it should be readily apparent to the reader that any other display technology may be adapted to implement the principles described below without departing from the scope of the present invention.

Embodiments provide a shutter which can switch between opaque and transparent and transparent and opaque sufficiently fast that the shutter can be used for an autostereoscopic display apparatus. The shutter uses LCD technology. Liquid crystals typically have one fast switching transition and one slow switching transition. The fast switching of the shutter is obtained by using a dual aperture array arrangement wherein the fast transitions are used to transition a portion of the shutter between opaque and transparent and back again.

Embodiments further provide a method of operating a dual aperture array shutter wherein fast transitions of the apertures are used for all or substantially all or at least a majority of shutter state transitions between opaque and transparent.

Embodiments provide a shutter, the aperture elements of which can be controlled so as to provide a range of slit characteristics. Thus, a shutter is provided which can be used for different optical arrangements and so different viewing arrangements. When the characteristics of the shutter are changed, the rendering method applied for generating an image on the screen must be modified to correspond to the change in slit characteristics.

In embodiments, the order in which slits is opened is determined so as to reduce the occurrence of unwanted optical effects such as striping and ghosting. Such an order is determined by minimizing a cost function associated with each effect, the cost function of each effect determined by the apparent severity of negative impact on the image as discussed in further detail below.

BRIEF DESCRIPTION OF THE DRAWINGS

Non-limiting embodiments of the present invention will be described by way of example with reference to the accompanying drawings, in which.

DETAILED DESCRIPTION OF THE DRAWINGS

Single Cell Shutter

A straightforward approach is a standard single cell LCD shutter. Such a shutter consists of a standard cell, i.e. a liquid crystal layer confined between two bounding plates which can switch quickly from dark to clear and equally fast from clear to dark.

Figure 2:
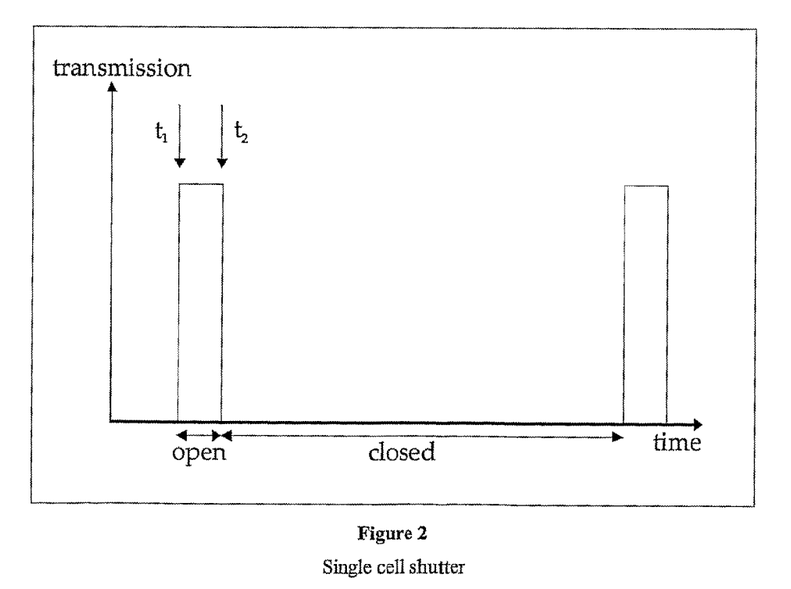
FIG. 2 shows a typical transmission function for an ideal individual slit.

FIG. 2 shows a typical transmission function for an ideal individual slit. The slit opens at $t_1$ and closes at $t_2$. The time to switch between two states should ideally be infinitely fast, but in practice is a finite time. This time is known as the rise-time and fall-time, and will set the maximum speed at which the shutter can be run. Since the slit is not blocking light properly during transition there will be some light leakage, which gives rise to faint unwanted images known as ghost images. In addition a loss of overall image contrast can be expected due to this transition leakage. Another factor that reduces contrast is the fact that LCD cells never manage to block light one hundred percent efficiently, even in a stable dark state.

Thus two criteria can improve the properties of time-multiplexed 3D displays:
1. Short transitions times between dark to clear and clear to dark, i.e. short rise and fall-times.
2. High contrast in the dark state to avoid ghost images and low overall contrast.

In practice most LCDs have relatively slow switching speeds because the fall-time is governed by a relaxation process. Thus most commercial LCD panels are unsuitable for time-multiplexed 3D. A technology that has proved suitable due to its high switching speeds and high contrast is the Ferroelectric Liquid Crystal Display (FLCD). It has attractive properties but manufacturing difficulties mean that few manufacturers use this material.

There are other immature technologies that may become suitable for time-multiplexed 3D. One is based on the flexoelectric effect in liquid crystals. This technology can potentially switch quickly with high contrast. Another employs the Dual-frequency Liquid Crystal (DFLC) which can also be quickly switched off by driving it at a different frequency rather than letting it relax slowly.

A problem with current shutter technology is that LCDs cannot reliably switch at the high rates required for a flicker free autostereoscopic display apparatus.

An LCD apparatus is typically arranged to switch between two states of polarization. Usually, degrees of polarization between the two states of polarization may also be selected with the LCD apparatus. The time to switch between two states is finite. The time for a transition from a first state to a second state is known as the rise-time and the reverse transition is known as the fall-time. The fall-time is typically a relaxation time and this is the strongest factor determining the maximum speed at which the shutter can switch. Since the slit does not block light properly during transition there is light leakage. Light leakage may give rise to faint unwanted images known as ghost images. In addition, a loss of overall image contrast can be expected due to this transition leakage. Another factor that reduces contrast is the fact that LCD cells do not exhibit zero percent transmission, even in a stable dark state.

These limitations in display technology are barriers to the production of a switchable aperture array for an autostereoscopic display apparatus that allows for the reproduction of a clear 3D image that is high contrast, flicker free and without ghosting.

Double Cell Shutter

Figure 3:
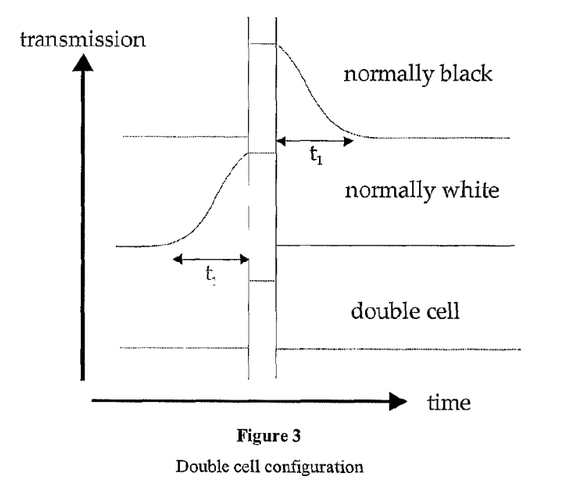
FIG. 3 shows a transmission function for a shutter comprising a double cell in conjunction with the transmission functions for each of the component cells.

A shutter with high contrast fast rise time and fast fall-time but using a standard liquid crystal material that switches quickly in only one direction, may be obtained by using a double cell solution. Such a shutter can be built up from two individual liquid crystal cells, one with a fast dark to clear transition and one with a fast clear to dark transition as shown in FIG. 3.

With two such cells working in conjunction a resultant transmission function with both sharp rise and fall-time can be achieved. The principle of the double cell shutter is shown FIG. 4.

Figure 4:
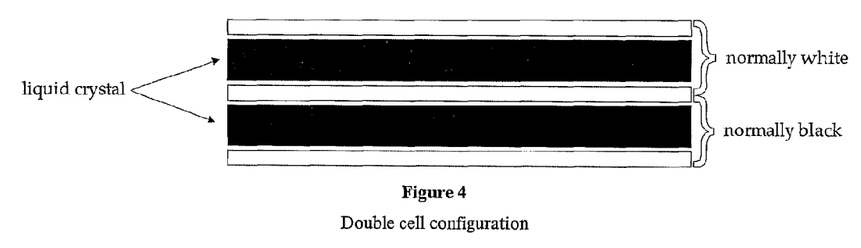
FIG. 4 shows the principle of a double cell shutter.

The top normally white cell is clear (commonly termed "white") in the art when no electric field is present. Similarly the normally black cell is opaque (commonly termed "black" in the art) when no field is applied. It may be desired to only have one pair of polarisers: one at the entrance plane and one at the exit plane. In practice a third polariser can be placed between the two cells which acts as a clean up filter to ensure that the light is correctly polarised when entering the next liquid crystal cell. There are numerous configurations of polarisers and liquid crystal material to achieve the same double cell effect with both fast rise time and fast fall-time, however only one example will be given. Assuming light enters the top of double cell shown in and assuming each cell is made up of a planar aligned (PA) liquid crystal material then one possible configuration is:
1. Polariser at 135°.
2. Liquid crystal with director at 90°.
3. Polariser at 45°.
4. Liquid crystal with director at 0°.
5. Polariser at 45°.

The middle polariser ensures correct polarisation state of the light entering the second cell. This may be particularly useful during the transition of the first cell when the polarisation state is unknown.

Hold Time

Some liquid crystals have an associated hold time when switching, which can set a minimum limit to the length of the pulse.

Figure 5:
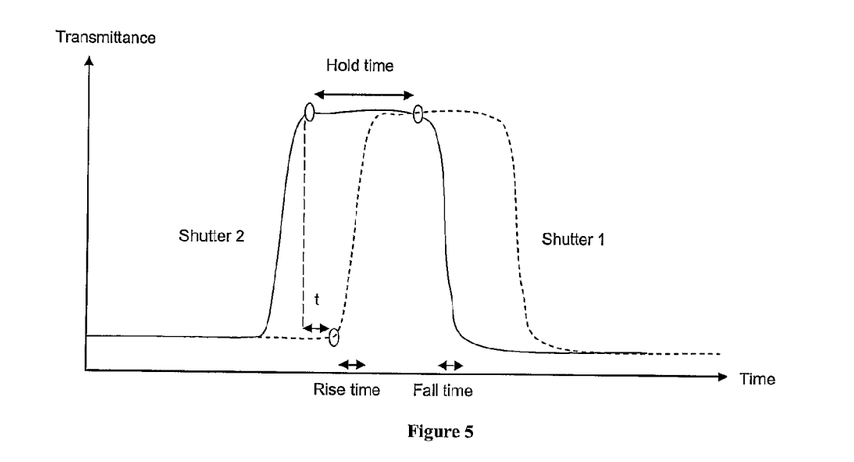
FIG. 5 shows the transmission function of a double cell shutter taking into account the hold time.

We make the following definitions:
$t_p$=Length of ideal square pulse that is being replicated
$t_r$=Rise time, the fastest transition for the liquid crystal
$t_f$=Fall time, the slowest transition for the liquid crystal
$t_h$=Hold time, the period that the liquid crystal stays in the same state, or changes state by less than 10%, before changing state completely Since the liquid crystal cannot be switched from transparent to opaque until it has switched from opaque to transparent the minimum square pulse has a duration $t_{pmin}=t_r+t_h+t_f$. Adding a second shutter remedies this problem as shown in FIG. 5. An improved pulse is then achieved by:
(i) having both shutters in the opaque state
(ii) setting the voltage for one of the shutters to switch to transparent, e.g. shutter 2
(iii) setting the voltage for shutter 2 to switch back to transparent a time t before the voltage for shutter 1 is set to switch to transparent, which is when the combined transparent pulse will start The time t can be set to select the length of the square pulse $t_{pmin}=t_r+(t_h-t)+t_f$ Normally Black Cell One challenge associated with the above configuration is the normally black (or opaque) cell. For the normally black cell to achieve high contrast it must act as a perfect half wave-plate which is difficult to achieve for planar aligned liquid crystals. Therefore this cell will often have considerably lower contrast than the normally white cell. There are a few solutions that can boost the contrast performance of the normally black cell:
1. Add dye to the liquid crystal to improve the dark state by absorbing light.
2. Place a compensation filter or compensation cell at the exit plane. A compensation cell could consist of a cell with identical cell thickness and liquid crystal properties as the cell being switched. A compensation filter could be a retardation film with properties matched to those of the cell being switched.
3. Use a vertically aligned (VA) liquid crystal configuration for the normally black cell, vertically aligned liquid crystals perform well in this arrangement.
4. Use a twisted nematic (TN) liquid crystal cell.

Retardation Films

A first requirement of the retardation film is that it has the correct retardation for one wavelength in the most sensitive part of the optical spectrum, around 554 nm. For optimum transmission, it should have a retardation value around 277 nm. However, the retardation value should also be matched to the liquid crystal cell, and a somewhat smaller value means a thinner cell with faster response, sacrificing the transmission to a small degree.

A second requirement of the retardation film is that the retardation should have the similar wavelength dependence to the liquid crystal used.

Figure 6:
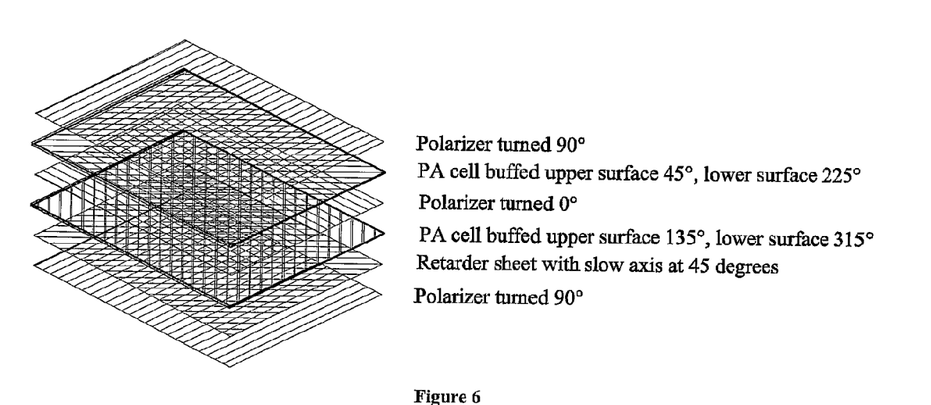
FIG. 6 shows a six layer double cell using a retardation film.

A third requirement of the retardation film is that it gives a good angular dependence together with the liquid crystal panel. This can be achieved by using a material with negative birefringence. If the retardation film is not explicitly designed to provide good angular properties, these may be improved by suitable orientation of the liquid crystal and the retardation film. For example, a panel with the rubbing, polariser and retardation film rotated 45 degrees, could reduce the angular dependence in the horizontal direction. FIG. 6 shows how a double cell can be made using a retardation film.

A retardation film according to embodiments may satisfy any combination of the above requirements.

FIG. 6 shows a six layer double cell using a retardation film. The first layer is a polarizer arranged at 90° to an alignment axis. The second layer is a Planar Alignment (PA) cell comprising liquid crystal arranged between an upper surface and a lower surface. The upper surface rubbed at 45° to the alignment axis. The lower surface buffed at 225° to the alignment axis. The third layer is a polarizer arranged parallel to the alignment axis. The fourth layer is a Planar Alignment (PA) cell having an upper surface buffed at 135° to the alignment axis and a lower surface buffed at 315° to the alignment axis. The fifth layer is a retarder sheet with its slow axis arranged at 45° to the alignment axis. The sixth layer is a polarizer arranged at 90° to the alignment axis.

Different Response Time and Driving Scheme

Figure 7:
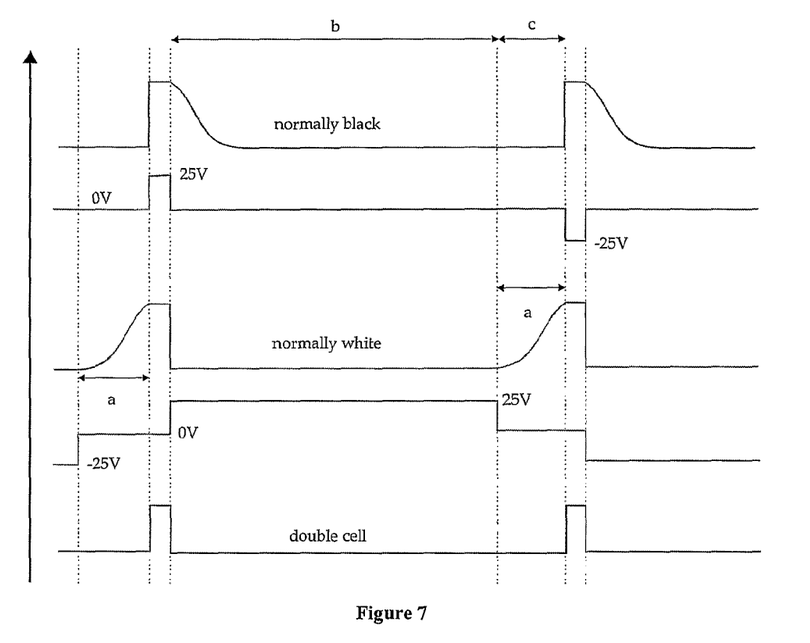
FIG. 7 shows an arrangement of a double cell shutter comprising a normally black cell and a normally white cell.

In some instances the contrast ratio will be different for the normally white and the normally black cell, with the normally black typically having poorer contrast. The overall contrast may be improved by maximising the time during which the cell with the higher contrast is in the black state. In FIG. 7 one can see how the normally black cell only needs to block light during period (c). If the fall time (a) of the normally white can be reduced then the overall contrast can be improved. The goal is to allow the normally white cell to block light as long as possible and let the normally black cell only when the normally white is transitioning, i.e. make period (b) as long as possible and (c), i.e. (a), as short as possible. Hence the cell could be optimised by having different response curves for the two cells. For example, the normally black cell could be thicker to give good contrast with a longer fall time, and the normally white cell could be thinner to give a shorter fall time. One could also use different liquid crystals in the two cells to achieve the same effect.

From FIG. 7 it is also clear that the repetition rate at which an individual pixel can be driven is governed by the sum of the fall times, which has to be kept in mind in aforementioned optimisation. These could be significantly reduced by employing dual-frequency liquid crystal in one or both cells, when a short pulse of much higher frequency is used to switch a cell off rapidly, as shown in FIG. 8.

Figure 8:
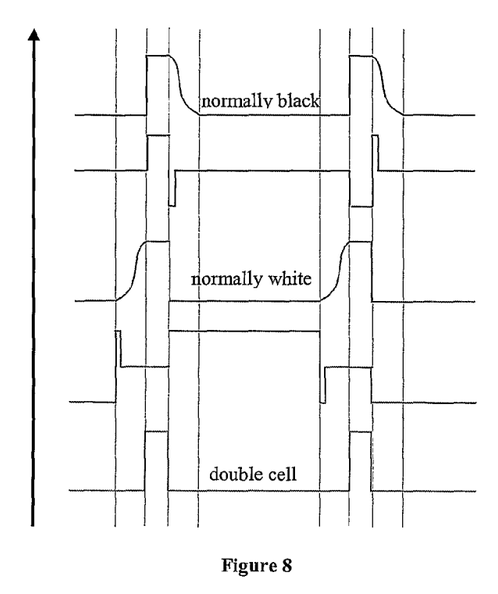
FIG. 8 shows a transmission function for a normally black cell, a normally white cell and a double cell comprising the two.

FIG. 8 shows transmission against time for a normally white cell, a normally black cell, and a double cell comprising a normally black cell and a normally white cell. FIG. 8 also shows drive signals (voltage against time) for the normally black cell and the normally white cell.

Electrically Commanded Surfaces

One way to improve contrast and switching time is to use Electrically Commanded Surfaces (ECS). The ECS technology involves the use of "active" alignment layers to affect favourably the switching of liquid crystal molecules in LCDs. The alignment layers are dynamically influenced by the electric field used for driving the LCD and their dynamic behaviour and interaction with the liquid crystal facilitates the switching of the liquid crystal molecules, leading to improved response time characteristics.

Variable Response Time

The response time may vary along the slits or other geometry being switched. The variation will depend on the resistivity per unit length of the strip and the capacity per unit length. One way to reduce the variation is to use a low resistance conductive layer. Another way is to connect both ends of the slits to the driver electronics. Yet another way is to add a metal wire along the slit to reduce resistance. Another solution is to compensate for the variation in response time by modifying the input image that is synchronised with the shutter.

Driver Electronics

Ensuring that there is no DC component in the controlling voltage considerably improves the lifetime of the device. One option is to use an AC drive signal, and by switching the front and back electrode 180 degrees out of phase the cell well experience a field which direction alternates and thus ensure the dc balance. Another possibility is to use a short dc pulse on one electrode only and in the next cycle apply a similar short dc pulse but with an inverted field. This will also ensure a zero bias. Higher voltage in the beginning of the pulse can in some instances shorten the rise time.

Figure 9:
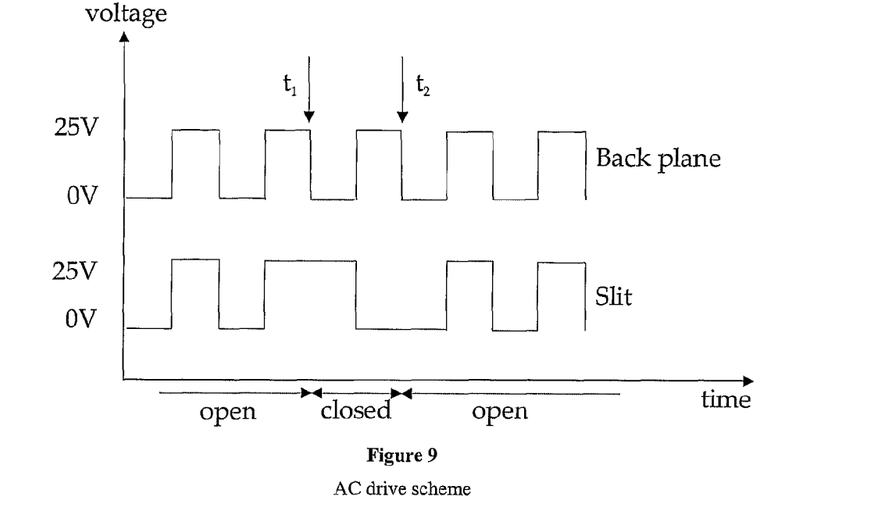
FIG. 9 shows an AC waveform used to drive a LCD.

One option is to drive the panels with an AC waveform as shown in FIG. 9. When the two wave forms are out of phase an electric field will switch the cell. Note that the polarity switches within one cycle thus providing a zero dc bias within the "closed" cycle. Since at one instant practically half the display is turned on the capacitance becomes very large. Assume a total cell area of 400 mm×300 mm, a cell gap of d=2.5 μm and a dielectric constant $\epsilon_r$ of 5. The total capacitance C of the cell is thus:

$$C = \epsilon_0 \epsilon_r A/d = 8.85 \cdot 10^{-12} \cdot 5 \cdot 0.12/2.5 \cdot 10^{-6} F = 2.1 \cdot 10^{-6} F$$

This is a considerable load to drive and requires a large peak current for good switching characteristics.

As mentioned above at any one point half the cell is driven, which gives a capacitive load of roughly 1 μF, which is still a large load to drive. Also, reducing the cell gap increases the problem, so from an electronics point a view this is undesirable.

Figure 10:
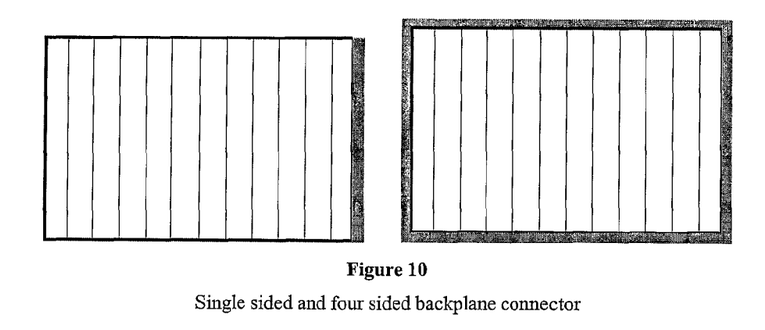
FIG. 10 shows the arrangements of a backplane connector.

One way to improve performance is to apply a contact to the backplane along all sides of the backplane ITO as shown in FIG. 10.

Figure 11:
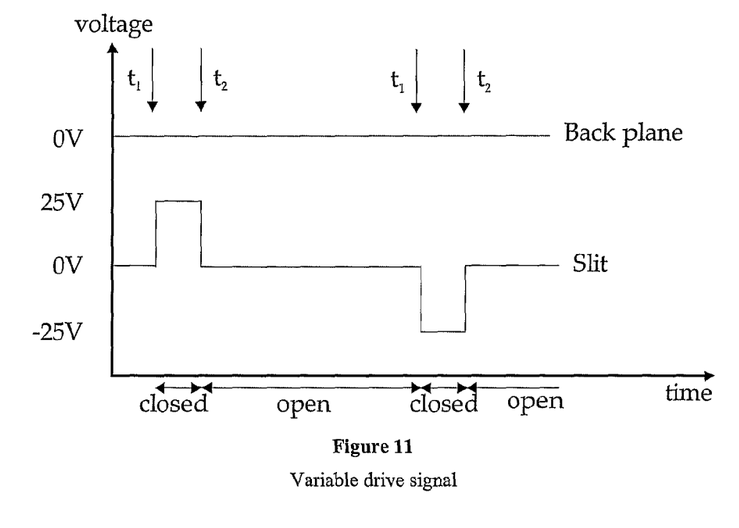
FIG. 11 shows the signal applied to one slit with a grounded backplane.

Another way to reduce the capacitive load is to drive each individual slit with alternating dc drive signals. This would mean that the backplane is constantly at ground and that each slit receives alternating fields, e.g. +25V and −25V. This ensures the zero dc bias condition and requires that only a strip is driven. Thus the entire backplane drive can be removed. The signal to one slit would be as shown in FIG. 11.

Switching of Slits or Pixels

The discussion in this section will focus on analyzing the linear aligned shutters, or slits. Thus the analysis can be performed for two dimensions. The same discussion holds for shutters that are pixelated or other aperture shapes.

Maximum Viewing Angle

Figure 12:
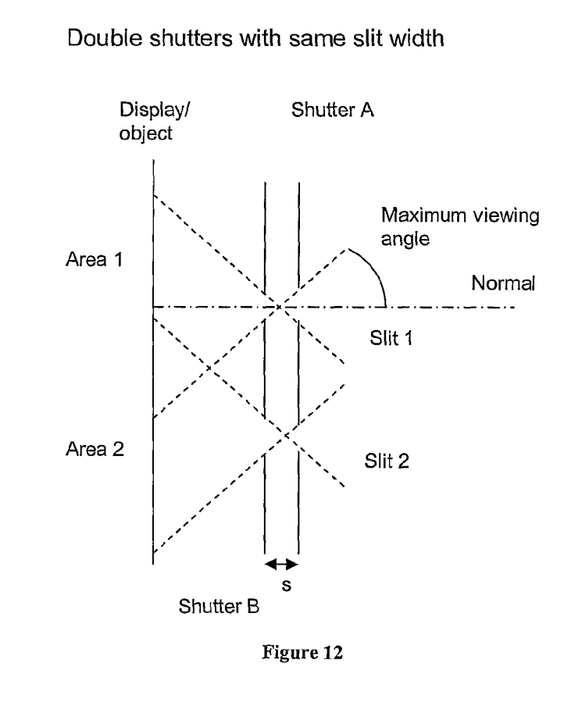
FIG. 12 shows the effect of a double cell shutter on a viewing angle.

With a single slit the maximum viewing angle is up to 180 degrees and only limited by the thickness of the cell and the maximum viewing angle for the liquid crystal. Having two or more shutters will change the maximum viewing angle as shown in the FIG. 12. Furthermore, the effective slit width will gradually become smaller when increasing the angle away from the normal going out from the center of the slit. This will make the brightness dependent on viewing angle and can introduce black stripes.

Figure 13:
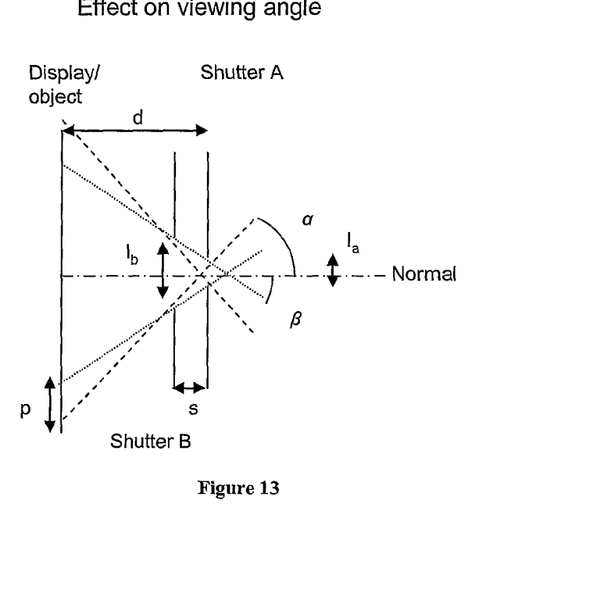
FIG. 13 shows a double cell shutter arrangement with improved viewing angle.

FIG. 13 shows the effect on viewing angle of adding an extra shutter. It has been drawn with the Shutter B, with the wider slit, between Shutter A and the display. However, a similar analysis would be applicable if it was further away from the display by a distance s. In some instances the viewing angle should not be reduced compared to having only one shutter. To achieve this one can ensure that the system is designed for viewing angles no greater than $\beta$. $\beta$ can be set through adjusting s and r according to:

$$\beta = \tan^{-1}\left(\frac{l_a(r-1)}{2s}\right) \quad \text{Equation 0.1}$$

$\beta$=the maximum angle at which the addition of a second shutter does not affect the brightness compared to only having one shutter $\alpha$=the maximum angle at which one will see the display through the slits s=the distance between the two shutters $l_a$=slit width for Shutter A $l_b$=slit width for Shutter B r=ratio between slit widths=$l_b/l_a$ d=distance between Display and Shutter A p=width on display where second shutter reduces brightness compared to only one shutter $l_b$ will be made up of several elements of width l'. Due to symmetry, l' will in many instances be a multiple of $l_a$ (because the slit for Shutter B will need to move along with the slit for Shutter A), which limits the range of values that r can take. Effectively the resolution of Shutter B determines at what steps $\beta$ can be changed dynamically. The equation can thus be written as below, where m is an integer=$l_a/l'$, which is the ratio of the resolution between the two shutters:

$$\beta = \tan^{-1}\left(\frac{ml'(r-1)}{2s}\right) \quad \text{Equation 0.2}$$

Another way to change the viewing angle dynamically is to change the distance between the two shutters. The mechanism for changing the distance can be combined with a device that accurately measures the distances s and d. This would allow other system parameters that are affected by these distances to be adjusted dynamically.

Typical Dimensions

In the current practical implementation the minimum distance between the two shutters is limited by glass substrate thickness. A typical glass substrate is 1.1 mm thick, although thinner substrates exist. The liquid crystal layer will be a few microns and can be ignored. For a double sheet the thickness s will be 2.2 mm and for a single 1.1 mm.

Two cases are considered, one with an 80 slit shutter and one with a 256 slit shutter. Both are assumed to be 400 mm wide, giving slit widths $l_a$ of 5 mm and 1.56 mm respectively.

In a basic setup r will typically be 1, 2 or 3, which gives the following viewing angles:

| | s = 1.1 mm | s = 2.2 mm |
|---|---|---|
| r = 1, 80 columns | $\beta = 0°, \alpha = 78°$ | $\beta = 0°, \alpha = 66°$ |
| r = 2, 80 columns | $\beta = 66°, \alpha = 82°$ | $\beta = 49°, \alpha = 74°$ |
| r = 3, 80 columns | $\beta = 78°, \alpha = 84°$ | $\beta = 66°, \alpha = 78°$ |
| r = 1, 256 columns | $\beta = 0°, \alpha = 55°$ | $\beta = 0°, \alpha = 35°$ |
| r = 2, 256 columns | $\beta = 35°, \alpha = 65°$ | $\beta = 20°, \alpha = 47°$ |
| r = 3, 256 columns | $\beta = 55°, \alpha = 71°$ | $\beta = 35°, \alpha = 55°$ |

It is clear that for most practical implementations an r of 1 will give low viewing angles. However, having three open slits on shutter two for each slit on shutter one (r=3) would give an undisturbed total viewing zone of 70° even in the most demanding example.

Geometric Limitation Due to Switching Speed

As explained earlier the fall time provides a limit to the period between pulses for a given slit for a double shutter solution. Now, this discussion assumed that the viewer will only look at the display through one slit on Shutter B for each slit on Shutter A. If the shutters are infinitely close together this could be the case. However, as described above in respect of typical dimensions, in many practical implementations this is not possible. Consequently, the analysis must take into account the effect of viewers looking through several combinations of slits. This is true for any value of r, i.e. the ratio of slit widths as defined in the section titled Maximum viewing angle.

Figure 14:
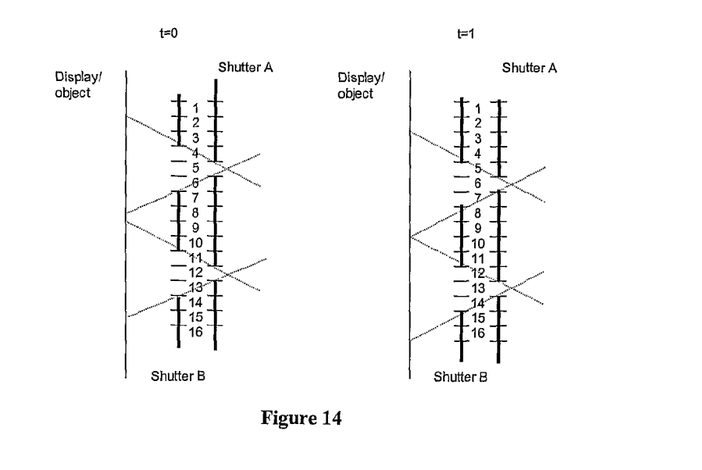
FIG. 14 shows opened shutter arrangements for consecutive sub-frames.

Assume the simplest solution for FIG. 14 where slits in Shutter A are switched in sequence. Going from t=0 to t=1, slit 5 for Shutter A should switch to black for all allowable viewing angles and slit 6 should switch to transparent for all allowable viewing angles. The first can simply be achieved by switching 5 to black using the quick rise time. Because of the asymmetric rise and fall time, one cannot achieve this while also switching 6 to transparent using a quick rise time. Hence, one would need to switch it to transparent in advance a time w×$t_r$, where $t_r$ is rise time and w the ratio between fall and rise time. This would have the adverse effect that slit 6 on shutter A would be partly open at t=0 when slits 5 and 6 on Shutter B are also open. The effect will be ghosting where information from the previous frames will be seen.

To avoid this the next slit to open on Shutter A could be set to be at least r slits away for t=1. If possible, an even larger distance is beneficial to avoid ghosting for viewing angles larger than that set by r and s.

Figure 15:
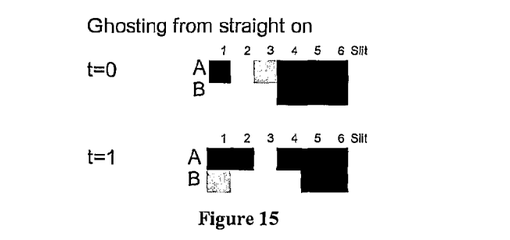
FIG. 15 shows an example of straight on ghosting.

There are a number of constraints on what is possible for this type of sequence and an important limiting factor will be the fall time for the liquid crystal cells. Two types of ghosting will be defined. The strongest case is shown in FIG. 15, where white indicates an open slit, black a closed slit and grey a slit that is partly open due to the finite fall time. The example shows a normally white cell as Shutter A and a normally black cell as Shutter B, with r=3. In this case there will be ghosting from looking straight on to slit 3 at t=0 since it needs to open in advance of t=1 due to the finite fall time. For each shutter state there will be r−1 states that would give this type of ghosting if they are placed in the next time slot.

Figure 16:
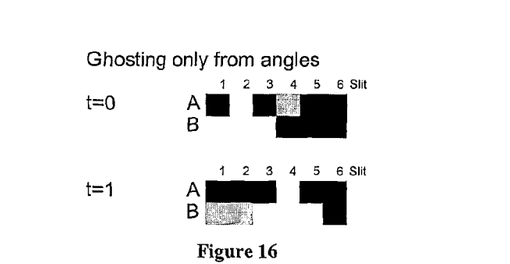
FIG. 16 shows an example of ghosting from an angle.

A weaker case is shown in FIG. 16. In this sequence there will be ghosting when looking at an angle through slit 4 for Shutter A and slit 3 for Shutter B at t=0. For each shutter state there will be r−1 states that would give this type of ghosting if they are placed in the next time slot.

The problem can be described as a number of shutter states in a repeated time sequence. Typically the number of shutter states equals the spacing between the simultaneously open slits (N). The number of states in the time sequence is usually the same, i.e. N. One way to improve the visual appearance of the sequence is to reduce the negative effect of the fall time $t_f$. This can be done by finding sequences based on constraint programming techniques. The following set of constraints is an example that would give an effective sequence:

- A number of slits will be open simultaneously with a spacing N
- N states are defined by the number of the first open slit in a set of simultaneously open slits
- Each state can be placed in any one of N time slots of length $t_p$ (the length of a frame)
- A cost function is defined to quantify the amount of ghosting for a given sequence. Ghosting is therefore minimised by searching for a sequence that minimises the cost function. An exact physical model of the ghosting phenomenon is not required; a set of heuristics that show approximately the same behaviour is sufficient.
  - Typically the cost will be highest for adjacent open slit states. The further apart the slits are the lower the cost. This function will be influenced by the allowable viewing region β and hence by r.
  - The cost will also decrease by a factor depending on how much later in time this state appears. For example, the cost will be higher if as in FIG. 15, state 2 comes at t=1 following state 1 at t=0, than if state 2 had come at t=2. Typically this factor will depend on the fall time of the respective shutters. In most cases the cost will be zero for t greater than the sum of the fall time for Shutter A and Shutter B respectively.

Typically, if N is large, r is small and the fall time short it will be easier to find an optimal sequence. In that respect, using materials with short fall time and putting the shutters close together will simplify the design.

Below is an example of a cost function where $f_1$ is the cost depending on separation in distance between shutter states and $f_2$ gives the relative cost depending on the separation in time. So $f_1(j)$=the cost for the jth adjacent slit opening at lth same time, and $f_2(k)$=the cost for the same slit opening k subframes later. Due to the repetitive nature in both time and space it should be noted that the functions will be based on modulus distances. The example is based on a setup where N=12, r=3 and the fall time is twice the duration of a frame or time slot.

$f_1(1)=1; f_1(2)=0,5; f_1(3 \text{ and above})=0; f_1(0)=100{,}000$
(should not come up)

$f_2(1)=1; f_2(2)=0,9; f_2(3)=0,8; f_2(4)=0,5; f_2(5 \text{ and above})=0; f_2(0)=0$ $D(p(t),p(t'))=\text{Min}((p(t')-p(t))\bmod(N); N-(p(t')-p(t))\bmod(N); N-\text{abs}(p(t')-p(t)))$, where p(t) returns the shutter state at time t, and D represents the distance between the states at time t and t'.

$T(t,t')=(t'-t)\bmod(N)$, which represents the distance in time between t and t'

For a given sequence the total cost will then be calculated by summing the product of the two functions for all time slots and all pairs of shutter states.

$$\sum_{t=0}^{t=11}\sum_{t'=0}^{t'=11} f_1(D(p(t), p(t'))) \times f_2(T(t', t))$$

Depending on the desired properties for the display one can choose which shutter mode to use for Shutter A and Shutter B. For example, Shutter A could be a normally white cell with higher contrast since it will be in the black state for a larger proportion of the cycle. In other instances one may choose to have a normally white cell with faster fall time and use that as Shutter B.

Also, N the number of steps between slits on Shutter A that are open at the same point in time must at least be 2r+1 if crosstalk between viewing regions is to be avoided. It should be noted though that in some cases this repeated viewing zone is desired.

The analysis in this section will also have influence in the optimization of the distance between the two aperture arrays, s as discussed above. In practical terms one may choose a smaller s because there will be additional cross-talk due to slow switching time.

Figure 17:
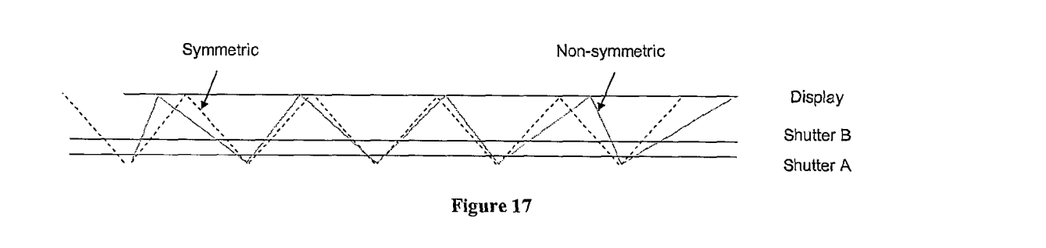
FIG. 17 shows a non-regular arrangement of the ratio r.

It should be noted that r does not have to be constant and the slit on Shutter B does not need to be centered with the slit of Shutter A. For example, the frustums may be shifted outwards as shown in FIG. 17. The dotted line indicates a symmetric frustum where the slit on Shutter B would be centered with the slit for Shutter A if they are defined as the intersection of the shutters and the frustum. The full line indicates a frustum that is shifted outwards and is non-symmetric in the sense that the slits for Shutter B are not centered with the slits for Shutter A if they are defined as the intersection of the shutters and the frustum.

Example of Double Shutter Implementation

An example of a double shutter LCD intended for horizontal parallax only 3D display, i.e. where a viewer will see different images only for different horizontal viewing positions, will typically consist of columns rather than pixels which is typically for conventional 2D LCD screens. Thus the shutter LCD screen will consist of many columns typically 1-5 mm wide that can switch between optically transparent and optically opaque. As described above, such an LCD screen can be achieved by using two panels: One that switches quickly from opaque to transparent (normally black) and one that switches quickly from transparent to opaque (normally white). To achieve a high switching speed, say a rise time of around 40 micro seconds, a cell gap of around 2.5 micrometers is used. One suitable liquid crystal material for use in both cells is MLC14300-100. The normally black and normally white cells are configured as described above with reference to the Double cell shutter overview, with the normally white using crossed polarisers and material director at 45° to input polarizer, which is achieved by rubbing the alignment material (for example PI 7992) at 45° with respect to polariser orientation. The normally black cell has the polarisers in parallel and with material director also aligned at 45° to input polariser as described above with reference to the Double cell shutter overview. Due to the narrow cell gap of the normally black cell a compensation film might improve contrast. In such case the compensation film is incorporated as shown in FIG. 6. Alternatively a third cell, an exact replica of the normally black is included as a compensation film. To achieve fast switching of the cells a high voltage is required. Typically around 25 volts will suffice to switch the panels in approximately 40 micro seconds. However, if a larger cell gap is required then a higher voltage will be required.

Modifying Viewing Zones

The shutter can also be used to vary the viewing zones dynamically, from narrow to wide cones. One way to do this is to change the width of the slits being switched by varying the number of adjacent slits being switched simultaneously. The image on the display that is synchronized with the shutter should be rendered to match the slit width to maintain a correct image. Another way to change the viewing zones is to have a mechanism to change the distance between the shutter and the display. Again the image on the display should be rendered to match the distance between the shutter and the display.

Embodiments of the present invention have been described with particular reference to the examples illustrated. However, it will be appreciated that variations and modifications may be made to the examples described within the scope of the present invention.

The invention claimed is:

1. A shutter for an autostereoscopic display, said shutter comprising:
    a first switchable aperture array comprising a plurality of cells being normally in a transparent state having a first transition time and a second transition time, the first transition time being the time required to change from a transparent state to an opaque state and the second transition time being the time required to change from the opaque state to the transparent state, wherein the first transition time is shorter than the second transition time; and
    a second switchable aperture array comprising a plurality of cells being normally in an opaque state having a third transition time and a fourth transition time, the third transition time being the time required to change from the opaque state to the transparent state and the fourth transition time being the time required to change from a the transparent state to the opaque state, wherein the third transition time is shorter than the fourth transition time;
    wherein said first switchable aperture array and said second switchable aperture array are arranged to at least partially overlap such that light passing through the first switchable aperture array then passes through the second switchable aperture array in sequence.

2. The shutter as claimed in claim 1, wherein the first and second switchable aperture arrays are aligned.

3. The shutter as claimed in claim 1, wherein the first and second switchable aperture arrays are arranged such that a line through the centre of both an aperture of the first switchable aperture array and an aperture of the second switchable aperture array is normal to the surface of both apertures.

4. The shutter as claimed in claim 1, wherein the first switchable aperture array is offset relative to the second switchable aperture array.

5. A shutter for an autostereoscopic display, said shutter comprising:
    a first switchable aperture array comprising a plurality of cells being normally in a transparent state having a first transition time and a second transition time, the first transition time being the time required to change from a transparent state to an opaque state and the second transition time being the time required to change from the opaque state to the transparent state, wherein the first transition time is shorter than the second transition time; and
    a second switchable aperture array comprising a plurality of cells being normally in an opaque state having a third transition time and a fourth transition time, the third transition time being the time required to change from the opaque state to the transparent state and the fourth transition time being the time required to change from a the transparent state to the opaque state, wherein the third transition time is shorter than the fourth transition time;
    wherein said first switchable aperture array and said second switchable aperture array are arranged to at least partially overlap such that light passing through the first switchable aperture array then passes through the second switchable aperture array in sequence;
    wherein the first switchable aperture array has a first fall time for switching from an opaque state to a transparent state, and the second switchable aperture array has a second fall time for switching from a transparent state to an opaque state; and
    wherein the first and second fall times are identical.

6. A shutter for an autostereoscopic display, said shutter comprising:
    a first switchable aperture array comprising a plurality of cells being normally in a transparent state having a first transition time and a second transition time, the first transition time being the time required to change from a transparent state to an opaque state and the second transition time being the time required to change from the opaque state to the transparent state, wherein the first transition time is shorter than the second transition time; and
    a second switchable aperture array comprising a plurality of cells being normally in an opaque state having a third transition time and a fourth transition time, the third transition time being the time required to change from the opaque state to the transparent state and the fourth transition time being the time required to change from a the transparent state to the opaque state, wherein the third transition time is shorter than the fourth transition time;
    wherein said first switchable aperture array and said second switchable aperture array are arranged to at least partially overlap such that light passing through the first switchable aperture array then passes through the second switchable aperture array in sequence,
    wherein the first switchable aperture array has a first fall time for switching from an opaque state to a transparent state, and the second switchable aperture array has a second fall time for switching from a transparent state to an opaque state;
    wherein the first and second fall times are different.

7. The shutter as claimed in claim 1, wherein one switchable aperture array has a higher contrast ratio than the other switchable aperture array.

8. The shutter as claimed in claim 7, further comprising a controller implementing a switching scheme applied to the shutter, wherein the switching scheme applied to the shutter is arranged such that the switchable aperture array with the greater contrast ratio is made to be opaque where either switchable aperture array may be used to make a portion of the shutter opaque.

9. The shutter as claimed in claim 1, wherein a greater number of switchable apertures are opened in one switchable aperture array than the other switchable aperture array.

10. The shutter as claimed in claim 8, wherein the switching scheme applied to the switchable aperture array is determined by minimizing a cost function associated with straight on ghosting and ghosting at an angle.

11. The shutter as claimed in claim 8, wherein a switching scheme applied to the switchable aperture array is determined by minimizing a cost function associated with striping.

12. The shutter as claimed in claim 8, wherein a switching scheme applied to the switchable aperture array is determined by minimizing a cost function associated with straight on ghosting, ghosting at an angle, and striping.

13. The shutter as claimed in claim 12, wherein the switching scheme defines when each aperture is opened and when each aperture is closed.

14. An autostereoscopic display comprising:
a two dimensional display; and
a shutter including:
    a first switchable aperture array comprising a plurality of cells being normally in a transparent state having a first transition time and a second transition time, the first transition time being the time required to change from a transparent state to an opaque state and the second transition time being the time required to change from the opaque state to the transparent state, wherein the first transition time is shorter than the second transition time; and
    a second switchable aperture array comprising a plurality of cells being normally in an opaque state having a third transition time and a fourth transition time, the third transition time being the time required to change from the opaque state to the transparent state and the fourth transition time being the time required to change from a the transparent state to the opaque state, wherein the third transition time is shorter than the fourth transition time; and
wherein said first switchable aperture array and said second switchable aperture array are arranged to at least partially overlap such that light passing through the first switchable aperture array then passes through the second switchable aperture array in sequence.

15. The autostereoscopic display as claimed in claim 14, wherein the first switchable aperture array is positioned between the second switchable aperture array and the two dimensional display.

16. The autostereoscopic display as claimed in claim 14, wherein the second switchable aperture array is positioned between the first switchable aperture array and the two dimensional display.

17. The autostereoscopic display as claimed in claim 14, wherein the two dimensional display comprises a screen of a projector.

18. The autostereoscopic display as claimed in claim 17, wherein the projector comprises a Digital Micromirror Device.

19. A method of operating a shutter, the shutter comprising:
a first switchable aperture array comprising a plurality of cells being normally in a transparent state having a first transition time and a second transition time, the first transition time being the time required to change from a transparent state to an opaque state and the second transition time being the time required to change from the opaque state to the transparent state, wherein the first transition time is shorter than the second transition time; and
a second switchable aperture array comprising a plurality of cells being normally in an opaque state having a third transition time and a fourth transition time, the third transition time being the time required to change from the opaque state to the transparent state and the fourth transition time being the time required to change from a the transparent state to the opaque state, wherein the third transition time is shorter than the fourth transition time; and
wherein said first switchable aperture array and said second switchable aperture array are arranged to at least partially overlap such that light passing through the first switchable aperture array then passes through the second switchable aperture array in sequence;
the method comprising:
    arranging the first switchable aperture array to be in a transparent state;
    arranging the second switchable aperture array to be in an opaque state;
    transitioning the second switchable aperture array from an opaque state to a transparent state, rendering a portion of the shutter transparent, and
    transitioning the first aperture array from a transparent state to an opaque state, rendering a portion of the shutter opaque.

20. The method as claimed in claim 19, further comprising selecting the first switchable aperture array to have a first fall time for switching from an opaque state to a transparent state, and the second switchable aperture array to have a second fall time for switching from a transparent state to an opaque state.

21. The method as claimed in claim 20, further comprising selecting the first and second fall times to be identical.

22. The method as claimed in claim 20, further comprising selecting the first and second fall times to be different.

23. The method as claimed in claim 19, further comprising selecting one switchable aperture array to have a higher contrast ratio than the other switchable aperture array.

24. The method as claimed in claim 23, wherein a switching scheme applied to the shutter is arranged such that the switchable aperture array with the greater contrast ratio is made to be opaque where either switchable aperture array may be used to make a portion of the shutter opaque.

25. The method as claimed in claim 19, further comprising opening a greater number of switchable apertures in one switchable aperture array than the other switchable aperture array.

26. The method as claimed in claim 19, further comprising applying a switching scheme to the switchable aperture array determined by minimizing a cost function associated with straight on ghosting and ghosting at an angle.

27. The method as claimed in claim 19, further comprising applying a switching scheme to the switchable aperture array determined by minimizing a cost function associated with striping.

28. The method as claimed in claim 19, further comprising applying a switching scheme to the switchable aperture array determined by minimizing a cost function associated with straight on ghosting, ghosting at an angle, and striping.

29. The method as claimed in claim 26, further comprising applying the switching scheme to define when each aperture is opened and when each aperture is closed.

30. The method as claimed in claim 27, further comprising applying the switching scheme to define when each aperture is opened and when each aperture is closed.

31. The method as claimed in claim 28, further comprising applying the switching scheme to define when each aperture is opened and when each aperture is closed.

* * * * *